United States Patent
Balasubramanian et al.

(10) Patent No.: US 10,904,072 B2
(45) Date of Patent: Jan. 26, 2021

(54) SYSTEM AND METHOD FOR RECOMMENDING AUTOMATION SOLUTIONS FOR TECHNOLOGY INFRASTRUCTURE ISSUES

(71) Applicant: Accenture Global Solutions Limited, Dublin (IE)

(72) Inventors: Ramkumar Balasubramanian, Bengalure (IN); Sandeep Bhutani, Mohali (IN); Chandrasekhar Pilla, Visakhapatnam (IN); Shallu Gupta, Delhi (IN); Sekhar Naga Venkata Maddula, Hyderabad (IN)

(73) Assignee: Accenture Global Solutions Limited, Dublin (IE)

( * ) Notice: Subject to any disclaimer, the term of this patent is extended or adjusted under 35 U.S.C. 154(b) by 68 days.

(21) Appl. No.: 16/237,469

(22) Filed: Dec. 31, 2018

(65) Prior Publication Data

US 2020/0162312 A1 May 21, 2020

(30) Foreign Application Priority Data

Nov. 19, 2018 (IN) .............................. 201841043496

(51) Int. Cl.
| | | |
|---|---|---|
| *H04L 12/24* | (2006.01) | |
| *G06N 7/00* | (2006.01) | |
| *G06F 16/2457* | (2019.01) | |
| *G06N 5/02* | (2006.01) | |
| *G06F 40/216* | (2020.01) | |

(52) U.S. Cl.
CPC .... *H04L 41/0636* (2013.01); *G06F 16/24578* (2019.01); *G06F 40/216* (2020.01); *G06N 5/022* (2013.01); *G06N 7/005* (2013.01); *H04L 41/069* (2013.01); *H04L 41/0686* (2013.01); *H04L 41/5074* (2013.01)

(58) Field of Classification Search
CPC .. H04L 41/0636; H04L 41/5074; G06N 5/022
See application file for complete search history.

(56) References Cited

U.S. PATENT DOCUMENTS

| | | | | |
|---|---|---|---|---|
| 5,944,839 A * | 8/1999 | Isenberg | ............. | G06F 11/2257 714/26 |
| 9,806,955 B2 * | 10/2017 | Duncan | ............... | H04L 41/0686 |
| 10,430,517 B1 * | 10/2019 | Mulwad | ................. | G06F 9/453 |
| 2010/0094677 A1 * | 4/2010 | Peltz | ................. | G06Q 30/0283 705/400 |
| 2014/0129536 A1 * | 5/2014 | Anand | ................... | G06N 7/005 707/706 |
| 2018/0018590 A1 * | 1/2018 | Szeto | ................. | G06F 21/6254 |

OTHER PUBLICATIONS

1st Examination Report dated Jul. 6, 2020 for Australian Patent Application No. 2019261735.

* cited by examiner

*Primary Examiner* — Esther B. Henderson
(74) *Attorney, Agent, or Firm* — Plumsea Law Group, LLC

(57) ABSTRACT

A system and method to intelligently formulate automation strategies for technology infrastructure operations are disclosed. The system and method include analyzing infrastructure issue data from support tickets and predicting automation solutions. A cost-benefit analysis is then performed on the automation solutions. Solutions can be ranked and recommended according to the cost-benefit analysis.

20 Claims, 10 Drawing Sheets

| INDUSTRY | SAMPLE TICKETS |
|---|---|
| OIL & GAS | 10.231.0.153 CURRENT CPU UTILIZATION: 100PERCENT CONFIGURED CRITICAL CHANGED FROM GOOD TO ERROR {1002 |
| HOSPITALITY | THE THRESHOLD FOR THE PROCESSOR INFORMATION\PERCENT PROCESSOR TIME\ TOTAL PERFORMANCE COUNTER HAS BEEN EXCEEDED. THE VALUES THAT EXCEEDED THE THRESHOLD ARE: PER {1004 |
| CHEMICALS | RIGOCAPPTEST01 'WINDOWS SERVERS- PERFORMANCE CPU UTILIZATION EXCEEDS 95% - COPY' THRESHOLD {1006 |

SYSTEM AND METHOD FOR RECOMMENDING AUTOMATION SOLUTIONS FOR TECHNOLOGY INFRASTRUCTURE ISSUES

CROSS-REFERENCE TO RELATED APPLICATION

This application claims priority to Indian Patent Application Number 201841043496, filed Nov. 19, 2018, the disclosure of which is hereby incorporated by reference.

TECHNICAL FIELD

The present disclosure generally relates to solutions for technology infrastructure issues. More specifically, the present disclosure generally relates to a system and method for predicting automation solutions for technology infrastructure issues.

BACKGROUND

Companies may use support ticketing systems to identify issues in their technology infrastructure. Users of the system, including employees or customers of the company, may fill out support tickets listing issues or incidents that require a solution. As the company and user base grows, the number of issues to be solved may also increase. To increase the efficiency and/or costs of resolving these issues, companies may attempt to automate at least some of the solutions. Conventional methods for identifying automated solutions rely on a manual assessment of existing support tickets to identify those that are most amenable to automation. These manual assessments are problematic for many reasons. They can be time consuming, requiring days to weeks for an assessment, depending on the number of support tickets to be reviewed. Manual assessments may also suffer from bias, lack of standardization of outputs and difficulties in quantifying any results of the assessment.

There is a need in the art for a system and method that addresses the shortcomings discussed above.

SUMMARY

A system and method for determining when technology infrastructure issues can be solved by automated solutions, and predicting solutions for the issues, is disclosed. By using machine learning to automatically identify issues that may be automated and classifying the issues according to possible automation solutions, the system and method can reduce the subjectivity and bias that results from manual technological assessments. The system and method may also lower technology infrastructure costs by predicting potential savings from automation along with predicting a break-even time. This allows automation to be selectively applied to issues or groups of issues that provide the most savings in the shortest period of time. Selective use of automation solutions may increase overall efficiency of technology infrastructure operations and may ensure human capital is allocated to problems that are more complex and/or sufficiently cheap to solve manually.

The system and method can be used to classify technology infrastructure issues and identify corresponding automation solutions already associated with a particular class/cluster/category. In addition, by considering both context and verbal meaning of text from the infrastructure issue data when classifying infrastructure issues, the disclosed systems and methods may further improve the accuracy of classification. This may reduce extraneous costs associated with implementing the wrong automation solutions to resolve infrastructure issues.

In one aspect, a method of predicting automation solutions for technology infrastructure issues includes the steps of analyzing information related to a plurality of technology infrastructure issues and extracting a set of data features corresponding to the plurality of technology infrastructure issues. The method also includes identifying a first set of technology infrastructure issues and predicting a first automation solution for the first set of technology infrastructure issues. The method also includes identifying a second set of technology infrastructure issues and predicting a second automation solution for the second set of technology infrastructure issues. The method also includes estimating a first cost-savings amount associated with implementing the first automation solution for the first set of technology infrastructure issues and estimating a second cost-savings amount associated with implementing the second automation solution for the second set of technology infrastructure issues. The method also includes ranking the first automation solution higher than the second automation solution when the first cost-savings amount is greater than the second cost-savings amount.

In another aspect, a non-transitory computer-readable medium storing software comprising instructions that are executable by one or more device processors to predict automation solutions for technology infrastructure is disclosed. The instructions include information for analyzing information related to a plurality of technology infrastructure issues and extracting a set of data features corresponding to the plurality of technology infrastructure issues. The instructions also include information for identifying a first set of technology infrastructure issues and predicting a first automation solution for the first set of technology infrastructure issues. The instructions also include information for identifying a second set of technology infrastructure issues and predicting a second automation solution for the second set of technology infrastructure issues. The instructions also include information for estimating a first cost-savings amount associated with implementing the first automation solution for the first set of technology infrastructure issues and estimating a second cost-savings amount associated with implementing the second automation solution for the second set of technology infrastructure issues. The instructions also include information for ranking the first automation solution higher than the second automation solution when the first cost-savings amount is greater than the second cost-savings amount.

In another aspect, a system for predicting automation solutions for technology infrastructure issues includes a device processor and a non-transitory computer readable medium storing instructions that are executable by the device processor. The instructions are executable to analyze information related to a plurality of technology infrastructure issues and extract a set of data features corresponding to the plurality of technology infrastructure issues. The instructions are also executable to identify a first set of technology infrastructure issues and predict a first automation solution for the first set of technology infrastructure issues. The instructions are also executable to identify a second set of technology infrastructure issues and predict a second automation solution for the second set of technology infrastructure issues. The instructions are also executable to estimate a first cost-savings amount associated with implementing the first automation solution for the first set of technology infrastructure issues and estimate a second cost-savings amount associated with implementing the second automation solution for the second set of technology infrastructure issues. The instructions are also executable to rank the first automation solution higher than the second automation solution when the first cost-savings amount is greater than the second cost-savings amount.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 10 is a schematic view of a set of support tickets, according to an embodiment.

DESCRIPTION OF EMBODIMENTS

The embodiments include systems and methods to intelligently formulate automation strategies for technology infrastructure operations. This may include analyzing and predicting automation solutions for technology infrastructure issues. As used herein, the term "technology infrastructure issue" refers to a problem, issue or incident associated with any kind of technology infrastructure. Technology infrastructure may refer to any hardware systems, software systems, network systems and/or related services that are used to maintain an information technology environment. Examples of hardware infrastructure include, but are not limited to: servers, computers, data centers, switches, hubs, and routers. Examples of software infrastructure include, but are not limited to: enterprise resource planning (ERP) software and customer relation management (CRM) software. Examples of network infrastructure include, but are not limited to: network enablement, internet connectivity, firewalls and security resources.

Figure 1:
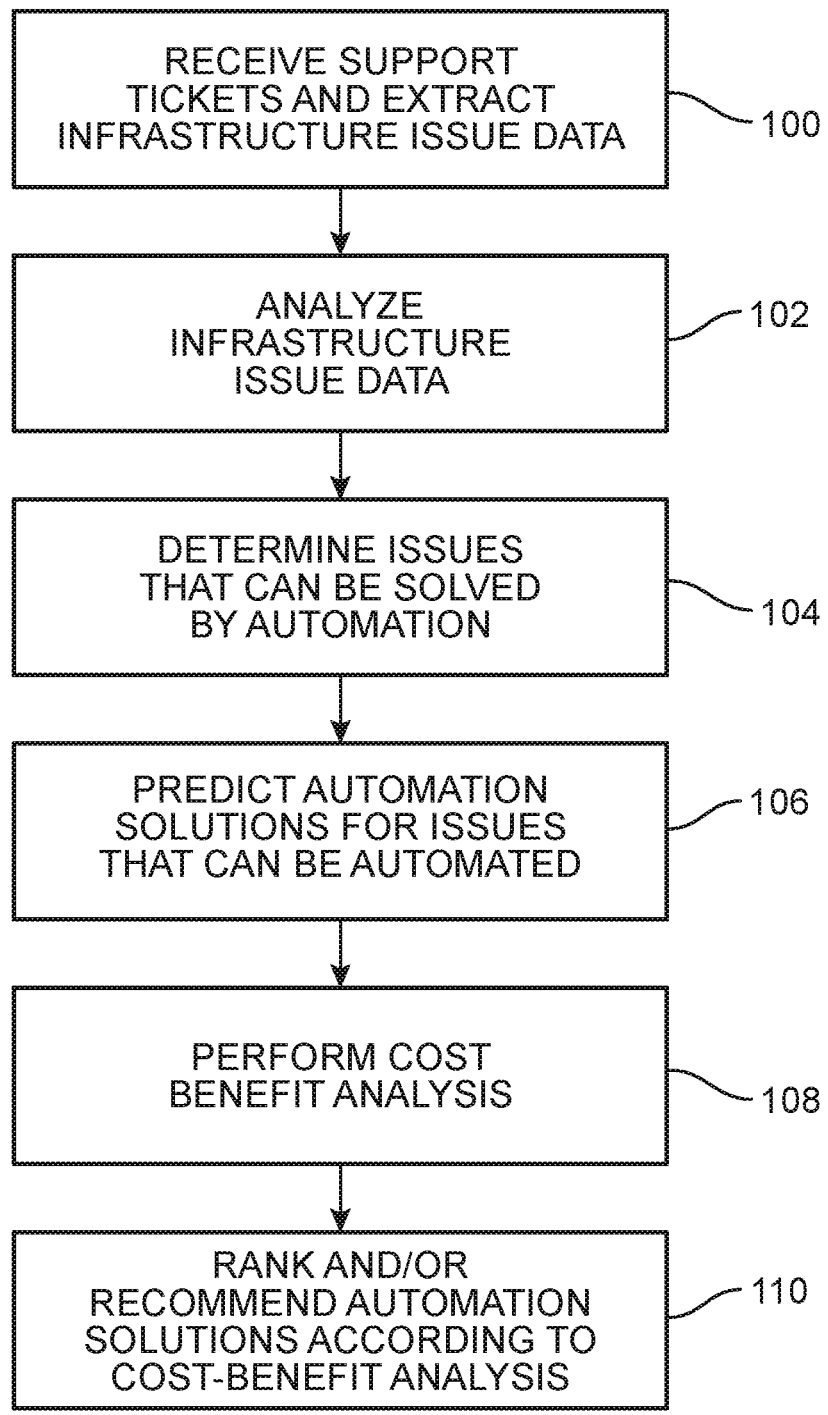
FIG. 1 is a schematic view of a process for recommending automation solutions to infrastructure issues, according to an embodiment.

FIG. 1 depicts a schematic process for generating automation solutions for technology infrastructure issues and evaluating their utility in terms of costs, savings, and other benefits. In the present embodiment, one or more of the steps in this process may be performed by an automation recommendation system. An automation recommendation system may take technology infrastructure issues as inputs and output recommendations, including recommendations for automating solutions to one or more issues. More specifically, an automation recommendation system may perform at least the following tasks: (1) analyze service tickets or other documents comprising infrastructure issues or incidents; (2) determine how feasible an automation solution may be for one or more issues; (3) suggest automation assets and/or one or more automation technologies (for example, scripting tools) that can be understood by developers; (4) calculate the manual effort spent if the solution is not automated; (5) provide a cost-benefit analysis for implementing automation solutions; and (6) predict the break-even time for recovering costs after implementing an automation solution.

An automation recommendation system, or simply recommendation system, may be associated with an information technology (IT) service provider. The term "IT service provider" (or simply "provider"), as used herein refers to any institutions or companies that provide and/or maintain technology infrastructure for a client, including other companies or individual customers. It may be appreciated that some companies could implement their own IT services and could therefore utilize the following systems and methods to resolve internal technology infrastructure issues.

In a first step 100, the recommendation system may receive support tickets. The support tickets may be any data, including digital or physical documents, generated by a support ticket system (also referred to as a trouble ticket system, an issue tracking system, a request management system or an incident ticket system). The recommendation system may then extract some or all of the information contained in the support tickets. This information may also be referred to as infrastructure issue information or infrastructure issue data. Alternatively, the term infrastructure incident information (or data) could be used.

Next, in step 102, the recommendation system may analyze the infrastructure issue data. As described in further detail below, this analysis may involve the use of multiple software modules for extracting features in the data, performing one or more transformations on the extracted features, and classifying the results. Based on this analysis, the recommendation system may determine which issues can be solved by automation in step 104. For this subset (which could include none, some or all of the set of issues analyzed in step 102), the recommendation system can predict automation solutions for the issues that can be automated, in step 106. It may be appreciated that in some embodiments, the step of identifying which issues can be solved by automation and the step of predicting an automation solution may be performed simultaneously. For example, in some embodiments both step 104 and step 106 can be performed by a single classification algorithm that outputs classes with corresponding automation solutions. Such classifiers could include an output value corresponding to no automation solution for issues that cannot be resolved through automation.

In step 108, the recommendation system can perform a cost-benefit analysis for the predicted automation solutions. This may include determining the costs of implementing an automated solution and an estimated savings over some period based on implementing the automated solution. This analysis may consider the estimated savings for implementing the automated solution with the total number of issues that have been identified with the proposed solution. Thus, in general, the estimated savings for a particular automated solution will increase according to the number of issues that can be addressed or solved with it. To predict savings, the system may calculate (or estimate) the manual effort (that is, working hours spent) that would be spent on accomplishing the task without automation. In some cases, in addition to a cost-benefit analysis (or as part of the analysis), the system can predict a break-even time for implementing each automation solution. Finally, in step 110, the recommendation system can rank and/or recommend automation solutions according to the cost-benefit analysis performed in step 108.

Figure 2:
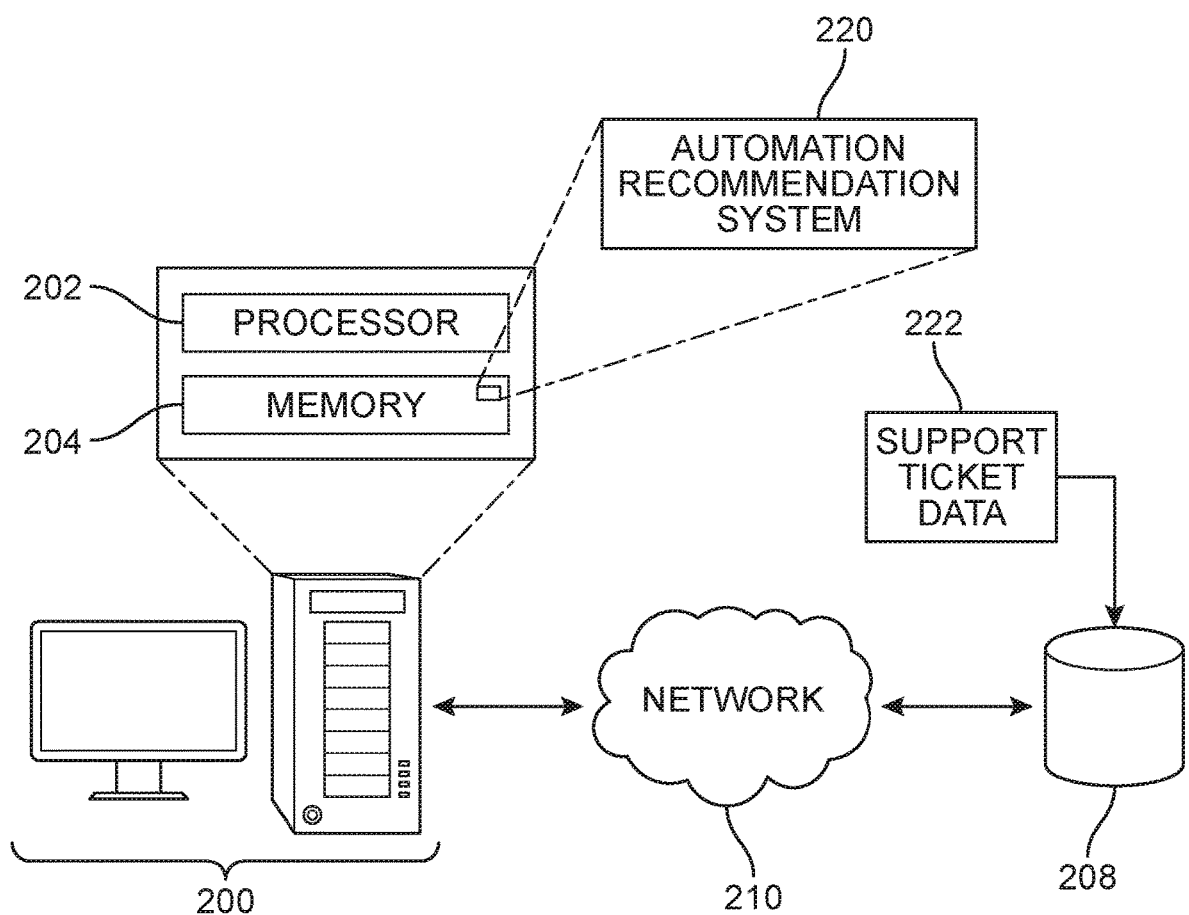
FIG. 2 is a schematic view of a system for accomplishing the process depicted in FIG. 1, according to an embodiment.

As shown in the embodiment of FIG. 2, a system for performing some, or all, of the steps described in the embodiments can include a computing system 200, a database 208 and a network 210. Computing system 200 could include a single computer, server and/or combination of multiple computers and/or servers. Computing system 200 may include at least one processor 202 and memory 204 for storing information, including software information and/or data. Processor 202 may include a single device processor located on a single device, or it may include multiple device processors located on one or more physical devices. Memory 204 may include any type of storage, which may be physically located on one physical device, or on multiple physical devices.

Computing system 200 may communicate with one or more databases 208 over network 210. In some embodiments, network 210 may be a wide area network ("WAN"), e.g., the Internet. In other embodiments, network 210 may be a local area network ("LAN"). For example, in a more remote location far from a metropolitan area, the Internet may not be available. In yet other embodiments, network 210 may be a combination of a WAN and a LAN.

The exemplary system can include an automation recommendation system 220 stored within memory 204. Automation recommendation system 220 may include any software, processes or services used in retrieving and/or analyzing infrastructure issue information. In some cases, support ticket data 222 can be uploaded to database 208 for later retrieval. Support ticket data 222 can be delivered and stored in any suitable data format. In some cases, support ticket data may be stored in a raw format. In other cases, support ticket data can be preprocessed and then stored in a database for later retrieval.

Figure 3:
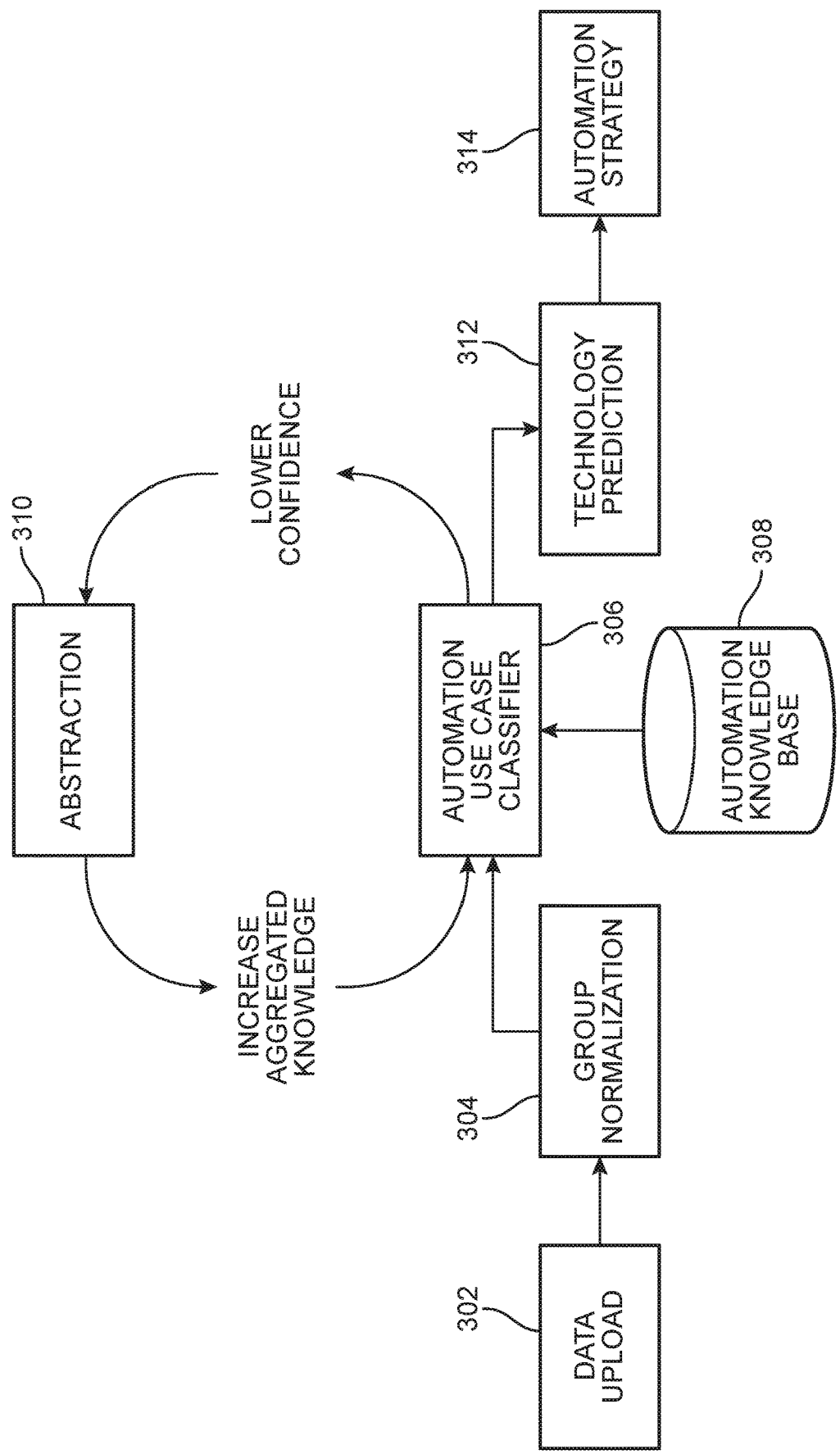
FIG. 3 is a schematic view of a high level systems and processes associated with the system of FIG. 2, according to an embodiment.

FIG. 3 is a schematic view of a set of modules that may be used to process issue data and provide automation strategies, according to an embodiment. In some embodiments, these modules may be considered as sub-processes to automation recommendation system 220 (see FIG. 2).

First, infrastructure issue data may be uploaded by a data upload module 302. In some cases, the process of uploading data may take the form of a data dump from a system responsible for tracking infrastructure issues (for example, a support ticket system) to database 208, and/or from database 208 to memory 204 of computing system 200. At this point, some, or all, of the information contained in the support tickets may be extracted. Exemplary data that may be extracted from support tickets includes, but is not limited to: a ticket or issue (incident) number, a short description of the issue, an assignment group, a creation date for the issue, a resolved date (for resolved issues), information about a related configuration item, information about any parent incident(s), resolution notes, or any other suitable issue information.

Next, a group normalization module 304 processes data from data upload module 302. Specifically, data retrieved by module 302 can be normalized according to group designations. For example, issues can be sorted according to different domains of standard infrastructure operations. Using this module may allow designated groups with overlapping domains to be identified with one another. In some cases, this step may be performed manually by a user of the automation recommendation system.

After group normalization, the issue data is passed to automation use case classifier module 306. Here, the issue data is classified according to automation use case. Specifically, the issue data is separated into distinct groups according to the assignment group found in any raw data and/or normalized group information determined in module 304. At this point, a Naïve Bayes engine is trained with any existing training data. The output that contains the predictions for the issue data within each group is written to same output file.

Using information retrieved from an infrastructure automation knowledge base 308, the module 306 decides whether a specific ticket is automatable or not. The automation knowledge base 308 may include a set of various operational activities along with whether the activity is automatable or not. In cases where an activity is automatable, automated knowledge base 308 may further include an associated automation solution. For example, in one embodiment the automated knowledge base 308 may comprise a set of 2500 operational activities created by industry experts across 15 domains. Each operational activity may be associated with a value indicating if the activity is automatable. If so, the activity may be associated with a particular automation solution that may also be stored within automated knowledge base 308. In some cases, automation solutions may be stored and associated with an index that may be referenced by the operational activities in the knowledge base.

When determining of there is an automation solution available for a given issue, module 306 may perform a preliminary classification analysis. If the preliminary classification analysis provides an output that is less than a minimal threshold, the recommendation system may send information about those issues to an abstraction process 310. The abstraction process 310 may be associated with any processes where users can manually review and label issue data to determine if the issue is amenable to an automation solution and/or to provide a suggested solution. The results of this process may be used to update the automation knowledge base 308. from the abstraction process. Thus, predicted solutions that initially have a lower confidence are transformed into increased aggregated knowledge by the abstraction process 310.

Issues that are amenable to automated solutions are then passed to technology prediction module 312. Module 312 may help identify the best possible technology for solving a specific issue. In some cases, module 312 may group the issues based on sequence (described in further detail below) to avoid any multiple co-related tickets which may cause efforts to be duplicated. For example, it is known that if there is a connectivity issue in a system, this may lead to multiple "node down" alarms. That is, issues that are caused indirectly by the connectivity issue. In such a case, solving the connectivity issue may simultaneously resolve additional issues that resulted from poor/no connectivity. Thus, sequencing the data early in the process helps prevent duplication of efforts by ensuring the root causes in a sequence of issues is handled.

Data may finally be passed to automation strategy module 314. Module 314 may consider various factors in determining whether an automation strategy is appropriate for a given issue or collection of issues. Factors that may be considered include, but are not limited to: time saved by the automation solution, invasiveness of the activity, complexity of the activity, mean time to repair (MTTR) savings, downtime savings, automated return on investment calculations, and potential benefits as they relate to any corresponding service level agreements (SLAs).

Figure 4:
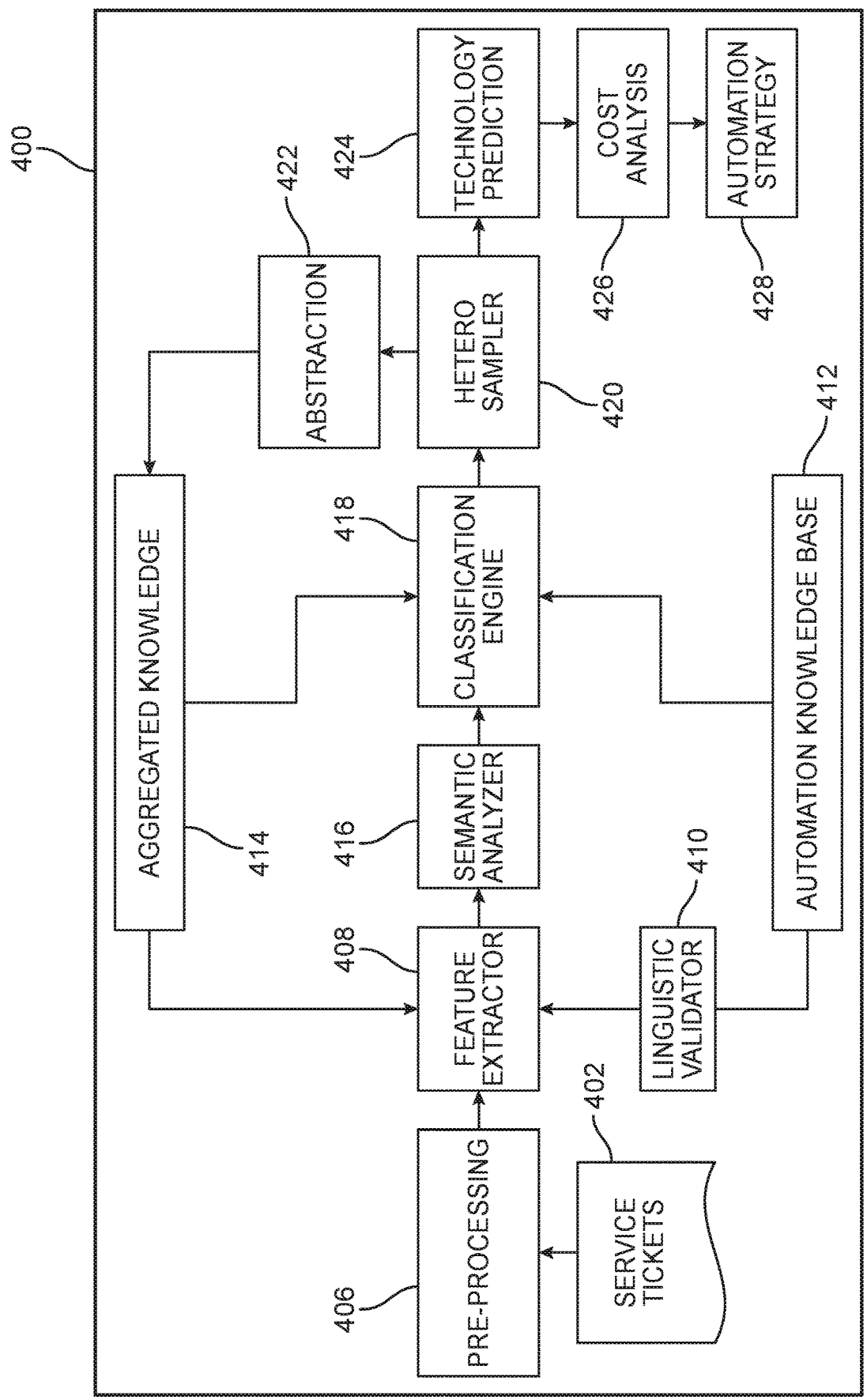
FIG. 4 is a schematic view of various modules for processing infrastructure issue information, according to an embodiment.

FIG. 4 is a schematic view of a more detailed technology architecture for an automation recommendation system, according to an embodiment. As described above, data from service tickets 402 may be retrieved from memory or an external database. The data may be sent to a pre-processing module 406. During pre-processing, data may be read in line by line and one or more of the following actions may be performed: converting letters to lowercase, word tokenization, removal of stop words, removal of numbers, stemming and lemmatization.

Preprocessed data may be fed into feature extractor 408. In some cases, this module may perform multiple transformations on the data to generate extracted features. This can include extracting n-grams (continuous sequences of n items from a given sample of text). This can also include converting the issue data into points in an n-dimensional vector space and extracting the Euclidean distance (with respect to the center of the vector space) for each point as a new feature. This can also include calculating the Cosine Similarity between the point in the n-dimensional vector space and a unit vector in the space as another new feature.

In some cases, feature extractor 408 may use information from both automation knowledge base 412, as well as from any new aggregated knowledge 414 that may be determined during processes further upstream from feature extractor 408. In some cases, information from automation knowledge base 412 can be passed through a linguistic validator 410. The linguistic validator 410 provides an enhanced corpus of meaningful words. Specifically, the linguistic validator 410 may be designed to recognize words that may be specific to the infrastructure knowledge base, including, nonstandard words or words from another language. After feature extraction, a semantic analyzer 416 can be used to normalize similar words. In some cases, a custom dictionary can be used for this process.

Data may then be passed to classification engine 418. This module may construct an ensemble prediction algorithm using one or more machine learning methods in an iterative manner. Exemplary methods include Naïve Bayes, Multinomial Naïve Bayes and Gradient Boosting Machines (GBM). In one embodiment, a Naïve Bayes model could be used. In other embodiments, any other suitable machine learning methods could be used for classification. Classification engine 418 may receive inputs from both automation knowledge base 412 and any recent aggregated knowledge 414 (which may or may not already be integrated into automation knowledge base 412).

A hetero sampler module 420 may produce a stratified sample of the entire dataset. Using a stratified sample may help increase the efficiency of the abstraction process by reducing the number of samples that must be manually reviewed and labeled. The output of hetero sampler module 420 may be passed to abstraction module 422 for validation and correction. The outputs of abstraction module 422 may include the aggregated knowledge 414 described above. This knowledge may include training data for the automation knowledge base 412. Information from previous uses of the system can be labeled and stored as centralized training data.

Data from hetero sampler module 420 may also be passed to technology prediction module 424. This module may identify appropriate automation technologies using verb analysis, Naïve Bayes classification, workflow grouping and/or decision need identification.

Cost analysis module 426 may estimate the cost of an activity that needs to be automated. This module could use various inputs or parameters including the complexity of the activity, the number of occurrences in the ticket/issue data and the median time for accomplishing the corresponding activity. Finally, automation strategy module 428 prepares an automation strategy based on the cost, which may include employment cost benefits.

To identify the appropriate automation technology an automation recommendation system may categorize issues according to different types of solutions. The types of solutions can include tasks, processes and cognitive solutions. Tasks may be identified by verbs. In some cases, the automation recommendation system may parse text from the infrastructure issue data and tag words according to part-of-speech (POS) labels. POS labels include "noun", "verb", "adjective" as well as other kinds of speech. Processes may be identified by sequencing support tickets and using a confidence hierarchy. Support tickets may be sequenced based on the source of the issue, a description of the issue, timelines and assignment groups. A process involves groups of tasks and the grouping may be identified by predicting and comparing class confidence levels (the class confidence hierarchy). Cognitive solutions are identified according to analyzing the natural language in the text.

Figure 5:
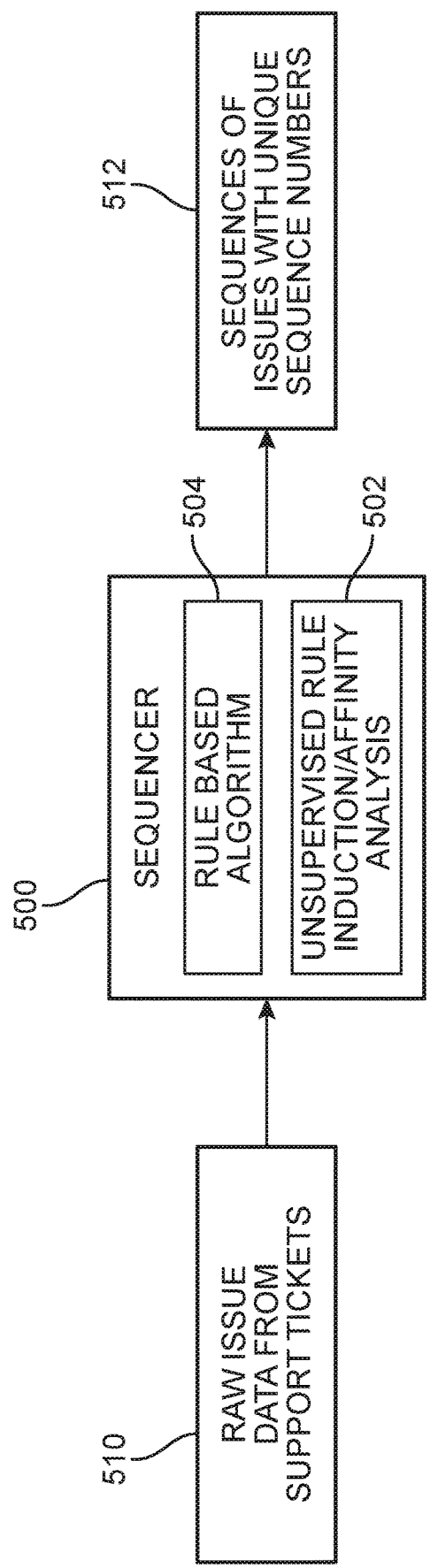
FIG. 5 is a schematic view of a sequencing module, according to an embodiment, according to an embodiment.

FIG. 5 is a schematic view of a sequencer 500. Sequencer 500 may comprise a software module responsible for identifying support tickets (or specific issues extracted from support tickets) that may be related. Using raw issue data 510 from support tickets, sequencer 500 may output sequences of incidents tagged with unique sequence numbers. Specific raw issue data that may be used can include time, source, issue/incident location, issue/incident category, description, parent/child ticket dependency and any other suitable kinds of data. During this analysis, sequencer 500 may identify the first issue that has occurred as the causation of all the rest of the issues in the sequence.

Sequencer 500 may use one or more machine learning algorithms. For example, the sequencing analysis may involve the use of one or more rule based algorithms 504. In one embodiment, a Random Forest algorithm can be used to extract rules based on goodness of fit measures such as information gain and Gini index. The sequencing analysis may also involve unsupervised rule induction and affinity analysis 502. In one embodiment, this may include using association rules based on goodness of fit measures like support, lift, confidence, length, actionability and explicability. In some cases, the "a priori algorithm" could be used.

By identifying different support tickets (or the corresponding infrastructure issues data) as being part of a common sequence, the automation recommendation system can reduce the chances that redundant solutions would be implemented. For example, by identifying a series of support tickets that may all be caused by a common connectivity issue as being part of a single sequence, the recommendation system can recommend implementing a single solution directed to the root cause (the connectivity issue), rather than implementing individual solutions for each separate support ticket/issue.

Figure 6:
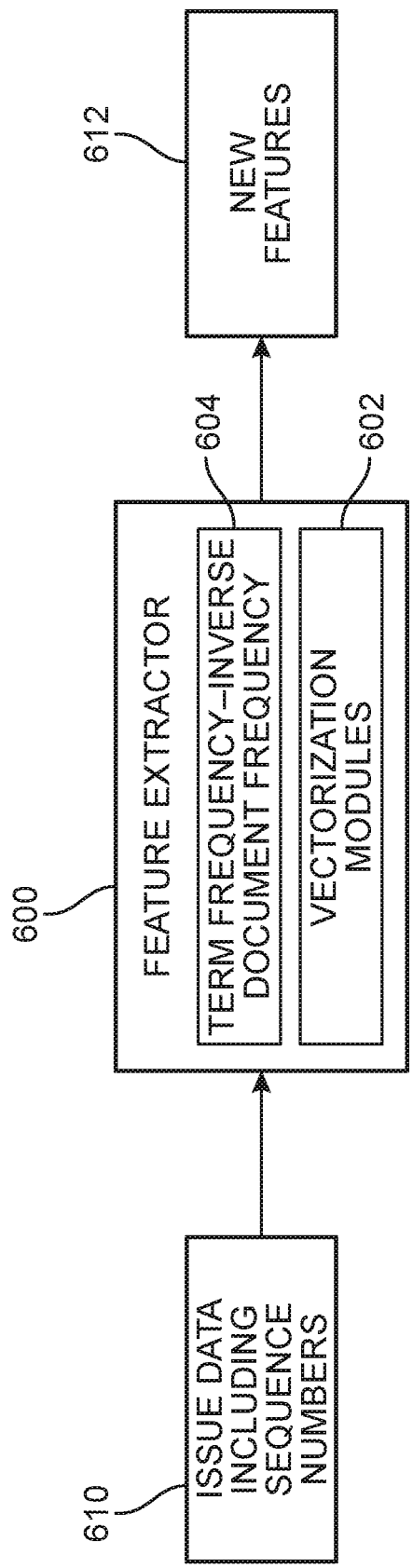
FIG. 6 is a schematic view of a feature extracting module, according to an embodiment, according to an embodiment.

FIG. 6 is a schematic view of a feature extractor 600. Feature extractor 600 may comprise a software module responsible for extracting new features 612 from issue data (and sequence numbers) 610. Feature extractor 600 may further include the use of vectorization modules 602. Feature extractor 600 may also include the use of term frequency-inverse document frequency (tf-idf) analysis 604.

Figure 7:
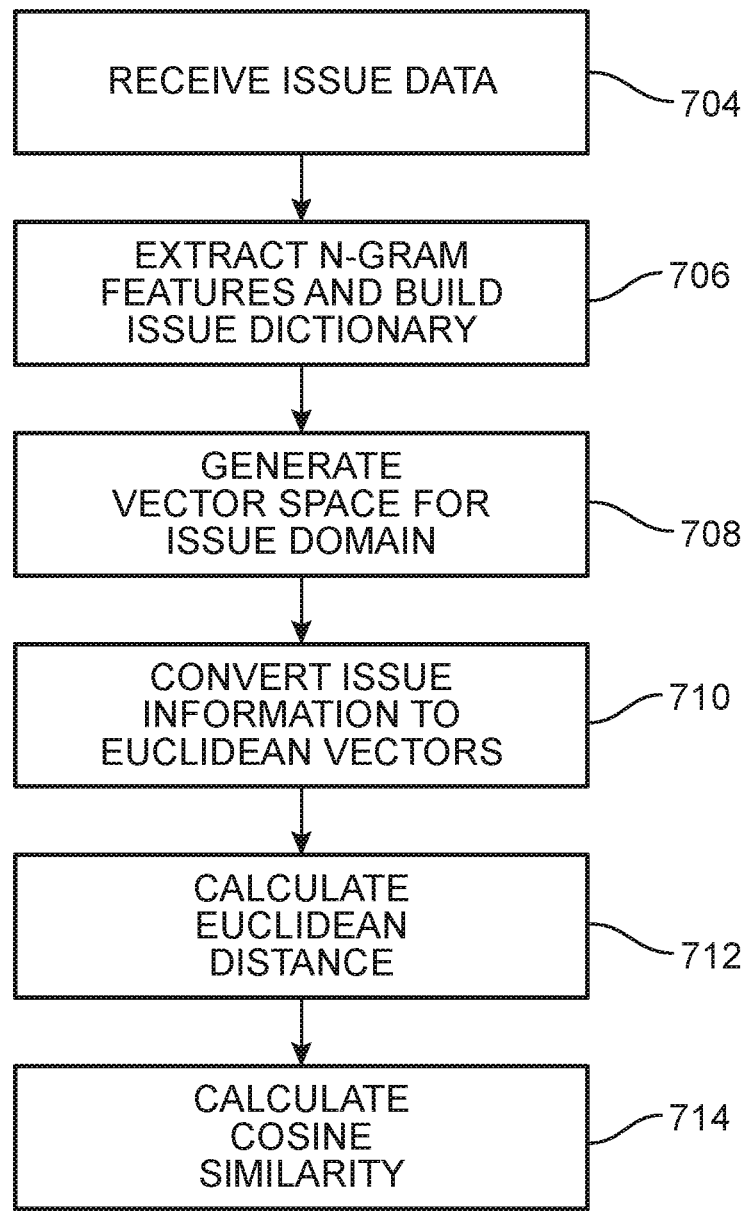
FIG. 7 is a schematic view of a process associated with the feature extracting module of FIG. 6, according to an embodiment.

FIG. 7 depicts a schematic process for extracting features from issue data. For convenience, the following steps are described as being performed by the feature extractor 600 of FIG. 6. However, it may be appreciated that some of these steps can be performed by one or more other modules of a recommendation system.

In a first step 704, feature extractor 600 receives issue data. In some cases, the data may be pre-processed (for example, by pre-processing module 406 from FIG. 4). In some cases, the issue data may include sequence numbers that have been generated by sequencer 500 (see FIG. 5). Next, in step 706, feature extractor 600 may extract n-gram features and build a dictionary to be used in an infrastructure issue space (described below). To extract n-grams, tf-idf analysis 604 could be used. Specifically, a if-idf matrix could be iteratively applied to different word orders until the matrix converges.

Next, in step 708, feature extractor 600 may generate a vector space for the infrastructure issue domain. The vector space may be built using the dictionary of words identified in step 706. In some cases, a software library such as Genism, can be used to analyze plain text and discover semantic structure in the text. This may be used to build a vector space model for analyzing the issue data.

In step 710, feature extractor 600 may convert issue information to Euclidean vectors in the vector space model created in step 708. In some cases, this can be done using algorithms in a software library such as Genism.

In step 712, feature extractor 600 may calculate the Euclidean distance between each of the vectors created in step 710 and the zero vector of the vector space model. Additionally, in step 714, feature extractor 600 may calculate the Cosine Similarity between vectors from step 710 and the unit vector of the vector space model. Both the Euclidean distance calculated in step 712 and the Cosine Similarity value calculated in step 714 may comprise new features identified by feature extractor 600, along with the n-gram features identified in step 706. By using both the Euclidean distance and the Cosine Similarity, the longitudinal and angular distances between points (which represent the infrastructure issues) in the vector space may be considered, giving a better sense of similarity than using either measure alone.

Figure 8:
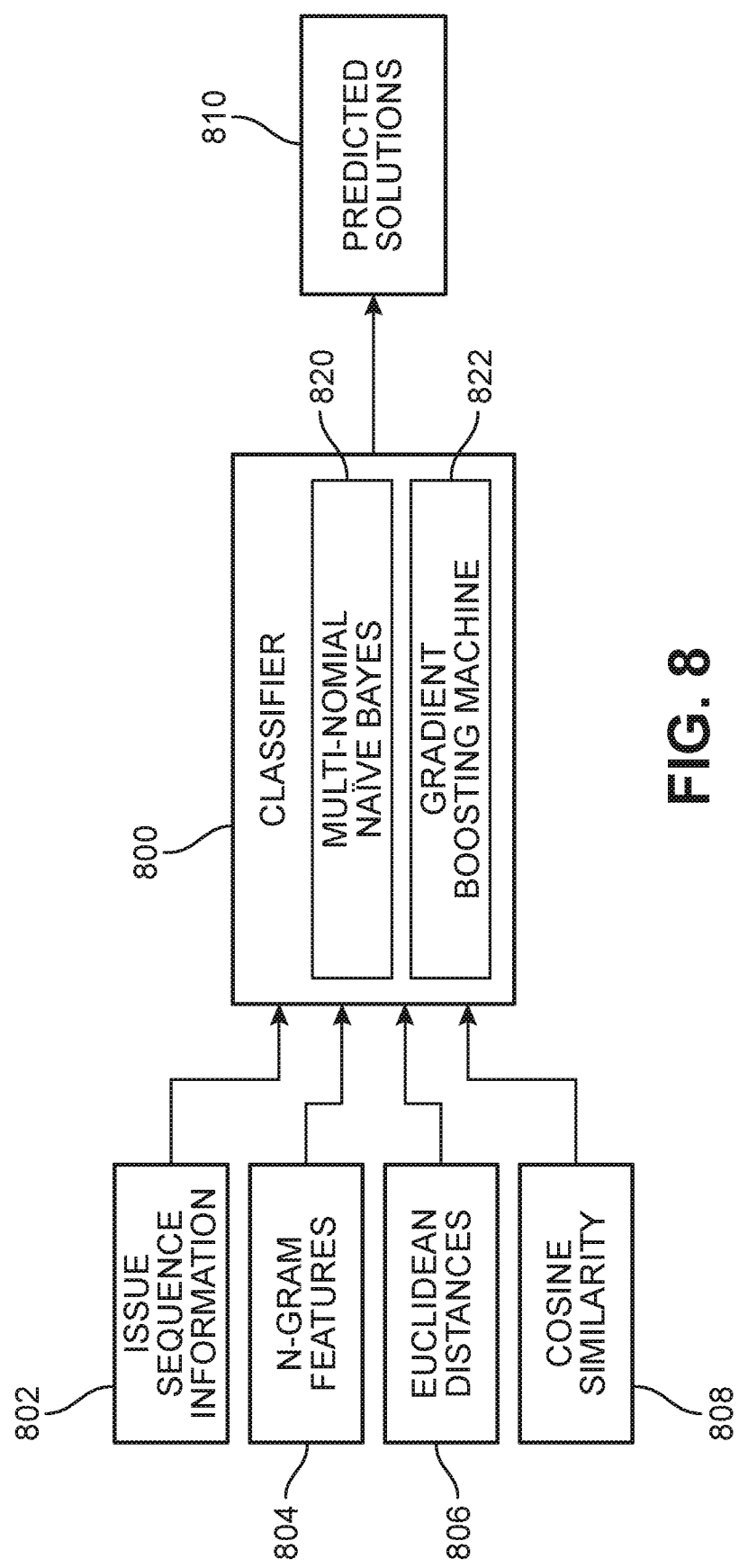
FIG. 8 is a schematic view of a classification module, according to an embodiment, according to an embodiment.

FIG. 8 depicts a schematic view of a classifier 800. Classifier 800 is a software module that takes in features identified by other modules (such as feature extractor 600) and outputs predicted automation solutions 810. Exemplary inputs include issue sequence information 802, n-gram features 804, Euclidean distances 806 and cosine similarity 808. Classifier 800 may use one or more machine learning algorithms to find predicted solutions 810. These may include Multinomial Naïve Bayes analysis 820 and Gradient Boosting Machines 822. In some embodiments, a single learning algorithm could be used, such as Naïve Bayes (or Multinomial Naïve Bayes).

Classifier 800 operates by identifying different issues in the infrastructure issue space (that is, the vector model determined by feature extractor 600) with a particular class/category (or cluster) in the space. These classes may further be identified with known historical automation solutions. Therefore, as new infrastructure issues are fed into the system, classifier 800 identifies an appropriate class for the issues and these classes are in turn identified with automation solutions stored in the infrastructure knowledge base. Over time, classifier 800 may be rebuilt to consider new categories that arise in the infrastructure incident space.

Figure 9:
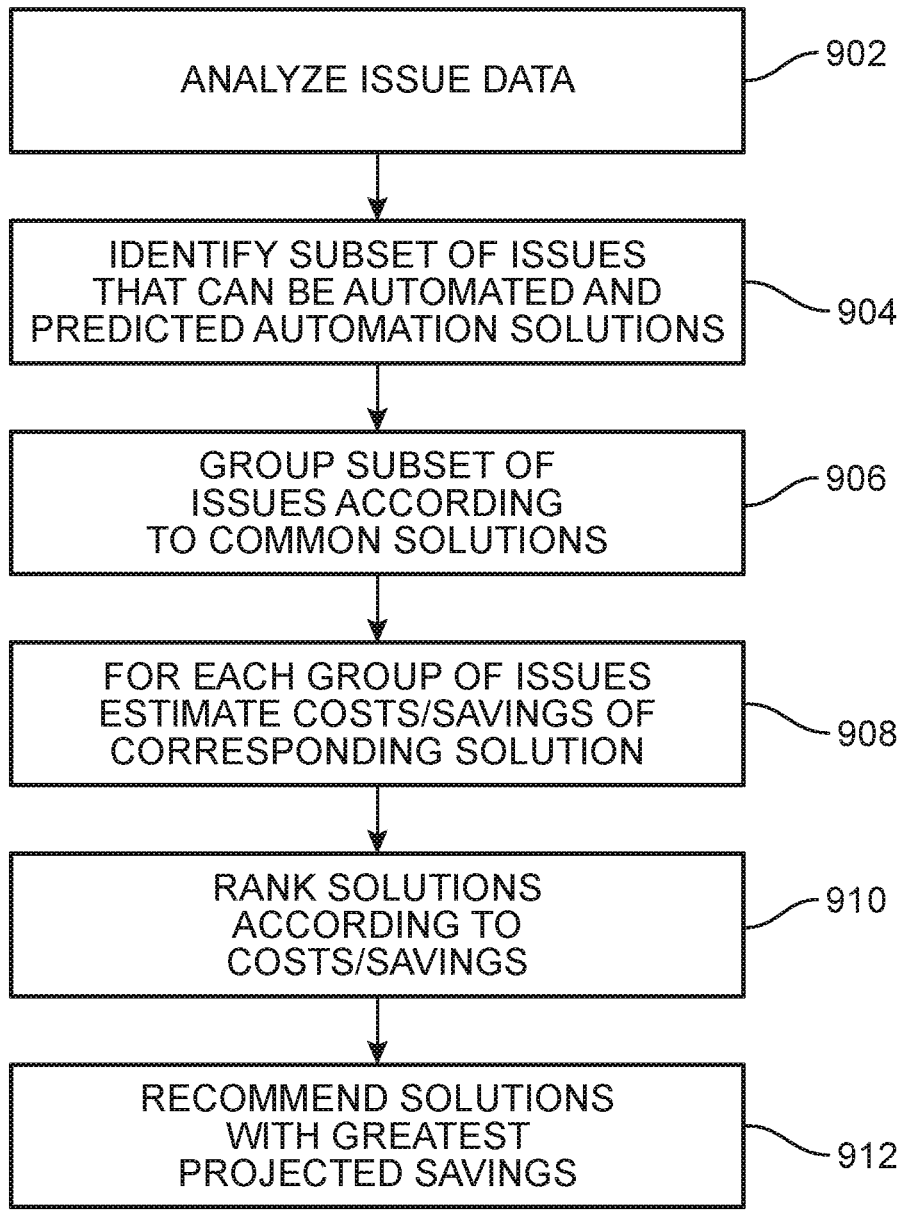
FIG. 9 is a schematic view of a process for recommending common automation solutions for groups of issues, according to an embodiment.

FIG. 9 depicts a schematic process for ranking and/or recommending automation solutions for particular issues or groups of issues. For convenience, the following steps are described as being performed by an automation recommendation system (for example, automation recommendation system 220). However, it may be appreciated that some of these steps can be performed by one or more other systems associated with a technology service provider.

In step 902, an automation recommendation system may analyze issue data. This analysis can include any of the processes described above and depicted schematically in FIGS. 1-8. In step 904, the recommendation system may identify a subset of issues that can be automated and also predict automation solutions for each of these issues.

In step 906, the recommendation system may group subsets of the issues according to common solutions. For example, FIG. 10 depicts a schematic table of support tickets. The table shows sample tickets from three different industries, including first support ticket 1002, second support ticket 1004 and third support ticket 1006. Although the support tickets are from different industries and superficially appear to be different, the automation recommendation system may analyze the tickets and predict a common automation solution for all three. That is, the system implicitly recognizes that these different tickets all correspond to a similar underlying technological problem. The system may therefore identify all of these support tickets/issues as comprising a single issue group 1010.

In step 908, the recommendation system can estimate costs/savings for the automation solution associated with each group. This may include any of the methods or techniques described above for identifying costs and savings/benefits. In some cases, this analysis can be performed by cost analysis module 426 (see FIG. 4).

In step 910, the recommendation system may rank the groups identified in step 908 according to costs/savings for the associated automation solution. The ranking can be determined according to any suitable metrics. An exemplary metric includes ranking the solutions according to the net savings for implementing each automation solution and applying the solution to all the issues in the associated group. In step 912, the recommendation system may recommend one or more solutions with the greatest projected savings, according to the rankings of step 910.

The various machine learning algorithms described above may be implemented using known machine learning software packages and/or frameworks. These include the SciPy library for the Python programming language and the Tensorflow machine learning framework. Specifically, the algorithms described above, including algorithms for implementing random forests, the "a priori" algorithm, the generalized rule induction algorithm, Naïve Bayes, term frequency-inverse document frequency, and gradient boosting machines may be implemented using known software packages.

Implementations of the various techniques described herein may be implemented in digital electronic circuitry, or in computer hardware, firmware, software, or in combinations of them (e.g., an apparatus configured to execute instructions to perform various functionality).

Alternatively, implementations may be implemented as a computer program embodied in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. Such implementations may be referred to herein as implemented via a non-transitory "computer-readable storage medium" or a "computer readable storage device."

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor may receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of predicting automation solutions for technology infrastructure issues, the method comprising:
    uploading data about a set of technology infrastructure issues to a computing system with at least one processor and memory;
    using rules learned by a first machine learning model to generate a unique sequence number for each issue in the set of technology infrastructure issues;
    extracting a set of data features corresponding to the set of technology infrastructure issues, wherein extracting the set of data features further includes:
        extracting n-grams for each issue and building a dictionary of words;
        creating a vector space model using the dictionary of words; and
        calculating a distance between each pair of vectors in the vector space model;
    providing the unique sequence numbers, the n-grams, and the calculated distances as inputs to a classification engine that has been trained using a second machine learning model;
    using the classification engine to predict a first automation solution for a first subset of technology infrastructure issues;
    using the classification engine to predict a second automation solution for a second subset of technology infrastructure issues;
    estimating a first cost-savings amount associated with implementing the first automation solution for the first subset of technology infrastructure issues;
    estimating a second cost-savings amount associated with implementing the second automation solution for the second subset of technology infrastructure issues; and
    implementing the first automation solution before implementing the second automation solution when the first cost-savings amount is greater than the second cost-savings amount.

2. The method according to claim 1, wherein the method includes the steps of receiving a plurality of technology infrastructure support tickets; and
    retrieving the information related to the plurality of technology infrastructure issues from the plurality of technology infrastructure support tickets.

3. The method according to claim 1, wherein the method further includes training the first machine learning model with a Random Forest model.

4. The method according to claim 1, wherein calculating the distance between each pair of vectors includes calculating a Euclidean distance.

5. The method according to claim 1, wherein calculating the distance between each pair of vectors includes calculating a cosine similarity.

6. The method according to claim 1, wherein predicting the first automation solution includes using a Naive Bayes model trained on inputs comprising sequence numbers, n-gram features, Euclidean distances, and cosine similarities.

7. The method according to claim 1, wherein predicting the first automation solution includes using a Gradient Boosting Machine model trained on inputs comprising sequence numbers, n-gram features, Euclidean distances, and cosine similarities.

8. The method according to claim 1, wherein the method includes producing a plurality of solutions corresponding to different groups of technology infrastructure issues, ranking the plurality of solutions, and recommending a subset of ranked solutions.

9. The method according to claim 1, wherein the method includes predicting a technology associated with the first automation solution, and wherein the technology is predicted by analyzing verbs in the information related to the plurality of technology infrastructure issues.

10. The method according to claim 9, wherein the technology is a software scripting technology.

11. The method according to claim 1, wherein extracting features includes applying a term frequency-inverse document frequency matrix to a set of words associated with one or more technology infrastructure issues.

12. A non-transitory computer-readable medium storing software comprising instructions that are executable by one or more device processors to predict automation solutions for technology infrastructure issues by:
    uploading data about a set of technology infrastructure issues to a computing system with at least one processor and memory;
    using rules learned by a first machine learning model to generate a unique sequence number for each issue in the set of technology infrastructure issues;
    extracting a set of data features corresponding to the set of technology infrastructure issues, wherein extracting the set of data features further includes:
        extracting n-grams for each issue and building a dictionary of words;
        creating a vector space model using the dictionary of words; and
        calculating a distance between each pair of vectors in the vector space model;
    providing the unique sequence numbers, the n-grams, and the calculated distances as inputs to a classification engine that has been trained using a second machine learning model;
    using the classification engine to predict a first automation solution for a first subset of technology infrastructure issues;
    using the classification engine to predict a second automation solution for a second subset of technology infrastructure issues;

estimating a first cost-savings amount associated with implementing the first automation solution for the first subset of technology infrastructure issues;

estimating a second cost-savings amount associated with implementing the second automation solution for the second subset of technology infrastructure issues; and implementing the first automation solution before implementing the second automation solution when the first cost-savings amount is greater than the second cost-savings amount.

13. The non-transitory computer-readable medium of claim 12, wherein the first machine learning model is a Random Forest model.

14. The non-transitory computer-readable medium of claim 13, wherein the second machine learning model is a Gradient Boosting Machine.

15. The non-transitory computer-readable medium of claim 13, wherein calculating the distance between each pair of vectors includes calculating at least one of a Euclidean distance and a cosine similarity.

16. The non-transitory computer-readable medium of claim 12, wherein extracting the set of data features includes using a non-linear classification algorithm.

17. The non-transitory computer-readable medium of claim 12, wherein the instructions are executable to predict automation solutions by producing a plurality of solutions corresponding to different groups of technology infrastructure issues, ranking the plurality of solutions, and recommending a subset of ranked solutions.

18. A system for predicting automation solutions for technology infrastructure issues, the system comprising:
a device processor; and
a non-transitory computer readable medium storing instructions that are executable by the device processor to:
upload data about a set of technology infrastructure issues to a computing system with at least one processor and memory;
use rules learned by a first machine learning model to generate a unique sequence number for each issue in the set of technology infrastructure issues;
extract a set of data features corresponding to the plurality of technology infrastructure issues, wherein extracting the set of data features further includes:
extracting n-grams for each issue and building a dictionary of words:
creating a vector space model using the dictionary of words; and
calculating a distance between each pair of vectors in the vector space model;
provide the unique sequence numbers, the n-grams, and the calculated distances as inputs to a classification engine that has been trained using a second machine learning model;
use the classification engine to predict a first automation solution for a first subset of technology infrastructure issues;
use the classification engine to predict a second automation solution for a second subset of technology infrastructure issues;
estimate a first cost-savings amount associated with implementing the first automation solution for the first subset of technology infrastructure issues;
estimate a second cost-savings amount associated with implementing the second automation solution for the second subset of technology infrastructure issues; and
implement the first automation solution before implementing the second automation solution when the first cost-savings amount is greater than the second cost-savings amount.

19. The system according to claim 18, wherein to estimate a first cost-savings amount, the instructions are executable by the device processor to calculate the manual effort spent performing an activity associated with the first automation solution.

20. The system according to claim 19, wherein the instructions are executable by the device processor to predict a break-even time for recovering costs associated with the first automation solution.

* * * * *